US012639422B2

(12) United States Patent
    Knierim

(10) Patent No.:  US 12,639,422 B2
(45) Date of Patent:       May 26, 2026

(54) AUTOMATIC, SECURITY-INDUCED RELOCATION OF AT LEAST ONE CONTAINER INSTANCE

(71) Applicant: Siemens Aktiengesellschaft, Munich (DE)

(72) Inventor: Christian Knierim, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 40 days.

(21) Appl. No.: 18/727,380

(22) PCT Filed: Nov. 22, 2022

(86) PCT No.: PCT/EP2022/082833
    § 371 (c)(1),
    (2) Date: Jul. 9, 2024

(87) PCT Pub. No.: WO2023/134910
    PCT Pub. Date: Jul. 20, 2023

(65) Prior Publication Data
    US 2025/0094562 A1      Mar. 20, 2025

(30) Foreign Application Priority Data
    Jan. 12, 2022    (EP) .................................... 22151152

(51) Int. Cl.
    *G06F 21/53*        (2013.01)
    *G06F 21/57*        (2013.01)
(52) U.S. Cl.
    CPC ............ *G06F 21/53* (2013.01); *G06F 21/577* (2013.01); *G06F 2221/034* (2013.01)

(58) Field of Classification Search
    CPC .. G06F 21/53; G06F 21/577; G06F 2221/034; G06F 21/51; H04L 63/1416; H04L 63/20; H04L 63/107
    See application file for complete search history.

(56) References Cited

U.S. PATENT DOCUMENTS 10,104,185 B1 * 10/2018 Sharifi Mehr ...... G06F 9/45558
2017/0098071 A1 *  4/2017 Stopel ................... G06F 21/554
(Continued)

OTHER PUBLICATIONS

PCT International Search Report for PCT/EP2022/082833 mailed Mar. 15, 2023.

*Primary Examiner* — J. Brant Murphy
(74) *Attorney, Agent, or Firm* — Schmeiser, Olsen & Watts, LLP

(57) ABSTRACT
A method and device for the automatic, security-induced relocation of at least one container instance in an orchestrated environment that contains more than one guest computer managed by an orchestration apparatus is provided, including the following steps: the orchestration apparatus launching the container instance on a first guest computer that comprises security functions in accordance with a first security level, receiving a security alarm message including at least one criticality parameter that indicates a security status of the orchestrated environment from a monitoring apparatus in the orchestration apparatus, the orchestration apparatus determining a second security level, different from the first security level, for the container instance based on a relocation policy depending on the criticality parameter, the orchestration apparatus relocating the container instance to a second guest computer in the orchestrated environment that includes security functions in accordance with the second security level.

15 Claims, 3 Drawing Sheets

(56)                    References Cited

U.S. PATENT DOCUMENTS

| | | | |
|---|---|---|---|
| 2018/0293374 A1* | 10/2018 | Chen | G06F 9/45558 |
| 2020/0050769 A1* | 2/2020 | Bhosale | G06F 16/907 |
| 2020/0073696 A1* | 3/2020 | Ashok | G06F 21/53 |
| 2020/0265134 A1* | 8/2020 | Cristina | G06F 21/54 |
| 2021/0185093 A1* | 6/2021 | Pollitt | H04L 67/10 |
| 2021/0406127 A1* | 12/2021 | Knierim | G06F 9/5072 |

* cited by examiner

AUTOMATIC, SECURITY-INDUCED RELOCATION OF AT LEAST ONE CONTAINER INSTANCE

CROSS-REFERENCE TO RELATED APPLICATIONS

This application is a national stage of PCT Application No. PCT/EP2022/082833, having a filing date of Nov. 22, 2022, which claims priority to EP Application Serial No. 22151152.0, having a filing date of Jan. 12, 2022, the entire contents both of which are hereby incorporated by reference.

FIELD OF TECHNOLOGY

The following relates to methods for automatic, security-induced relocation of at least one container instance in an orchestrated environment, which comprises more than one guest computer with different security functions managed by an orchestration apparatus.

BACKGROUND

Container virtualization is a method in which multiple instances of an operating system can use an operating system kernel of a guest computer in isolation from one another. Software containers, hereafter referred to as containers for short, thus represent a lightweight type of virtualization of a runtime environment on a guest computer, also termed a host system, and encapsulate a software application operated in a container from the underlying guest computer. Software applications are now implemented in many areas by container technology, for example in industrial automation and process control, but also in transport systems or building automation.

In order to launch a container on the guest computer, a container image is required which, in addition to the application software itself, also contains the binaries and libraries required for the application software. A container, more precisely a container instance, is created on the guest system from the container image and executed in the runtime environment of the guest system. An orchestrated runtime environment comprises an orchestrator and at least one, usually a plurality, of guest computers that are assigned to the orchestrator. The orchestrator launches, manages and terminates container instances on the assigned guest computers.

In orchestrated runtime environments, especially in the cloud-based model, there are multiple options for selecting the target platform, i.e. the guest computer on which a container instance is run. For example, orchestrated container instances can be operated on container-as-a-service platforms shared with other customers. In this case, the underlying guest computers can be addressed by more than one orchestrator. In this case, the orchestrator does not see the underlying guest computers; they are completely transparent. Orchestrated container instances can also be operated on a dedicated physical or virtual host system available to a customer, which are independently managed by the customer.

US 2018/293374 A1 describes a non-intrusive security self-test of containers at runtime. A persistent data store associated with the container, which comprises a read-only lower layer, is checked when a write request occurs. If it is detected that the container is in a threat state when checking the requested modifications, a container engine that is part of an orchestration software is instructed to respond to the threat state. Examples of responses include classifying the container into a threat level or migrating the container to a quarantine zone.

The different target platforms can be protected against attacks and unwanted manipulation in different ways. For example, highly secure host systems use integrity monitoring solutions, host-based intrusion detection systems or file integrity monitoring. On less well protected host systems, only parts of these monitoring solutions are implemented. Different protection levels can also be provided by the fact that the same monitoring solutions are in use but are deployed with different levels of restriction on the different platforms, or even the same solutions may also have a less restrictive configuration. Less well protected host systems therefore require fewer resources, such as implemented security features and computing capacity, and incur lower operating costs.

Therefore, it is often desirable not to operate all container instances permanently on highly secure host systems in an orchestrated environment, but in order to optimize resources and avoid costs, to operate the container instances managed by the orchestrator on host systems with different levels of security and thus to provide them with varying degrees of protection. Attacks on host systems or newly discovered security gaps change the vulnerability of the host system to attack. This creates the problem that container instances on weakly protected host systems are permanently insufficiently protected.

SUMMARY

An aspect relates to a method with which container instances can be operated on resource-optimized and thus weakly protected host systems of an orchestrated environment comprising host systems with different levels of protection, while the execution of the container instance is still permanently sufficiently protected.

In embodiments, it is an aspect of the present invention to provide a solution that makes it possible, depending on the state of the target node or the container instance operated on it, to temporarily stop the container instance on the runtime environment provided for it and to operate it on a better protected system.

According to a first aspect, embodiments of the invention relate to a method for automatic, security-induced relocation of at least one container instance in an orchestrated environment, which has more than one guest computer managed by an orchestration device, comprising the steps of the orchestration device launching the container instance on a first guest computer that comprises security functions in accordance with a first security level, receiving a security alarm message comprising at least one criticality parameter indicating a security state of the orchestrated environment, from a monitoring device in the orchestration device, the orchestration device determining a second security level, different from the first security level, for the container instance based on a relocation policy depending on the criticality parameter, the orchestration device relocating the container instance to a second guest computer in the orchestrated environment, which comprises security functions in accordance with the second security level, wherein the orchestration device receives information about the security state in the guest computers of the orchestrated environment and the executed container instance dynamically by the security alarm message and the criticality parameter indicates a measure of this security state.

The orchestrated environment comprises guest computers with different security levels, i.e. at least one first and one second security level. By the security alarm message, which is sent by the monitoring device and received in the orchestration device, the orchestration device receives information dynamically on the security state in the guest computers of the orchestrated environment and the executed container instance. The orchestration device can respond to this in a targeted manner by the relocation policy with a relocation of the container instance. This means that the container instance can be run securely on the guest computer with the first security level and will only be relocated to the second guest computer with a higher, second security level if the security state changes. The second security level indicates a higher level of protection compared to the first security level. This optimizes resources in terms of computing capacity and functionality, and thus also saves operating costs.

The criticality parameter specifies a measure for the security state and, together with the relocation policy, enables a differentiated relocation of the container instance appropriate to the security state.

In an embodiment, the first security level is assigned to the container instance as a default security level of the container instance in the relocation policy and/or in provisioning information.

The default security level is provided to the container instance by a user of the container instance in the provisioning information and/or the relocation information. The provisioning information includes specifications, in particular resources, privileges and other information, that is allocated when the container instance is launched. By providing the first security level or the default security level as part of the provisioning information or the relocation policy, each container instance is launched on the guest machine with the security level corresponding to the allocated default security level when it is first booted. This enables a resource-optimized execution of the container instance from the initial launch.

In an embodiment, the security alarm message is sent from the monitoring device to the orchestration device when a security-critical event is identified depending on at least one monitoring message, which is received from at least one guest computer of the orchestrated environment and/or from the container instance in the monitoring device.

This means that different security-critical events that depend on the monitoring messages are detected and automatically reported to the orchestration device. In an embodiment, the monitoring messages are transmitted at run time from the guest computer so that the security alarm message can be generated within a short time of the identified security-critical event and received and implemented in the orchestration device.

In an embodiment, the criticality parameter is determined depending on the security-critical event and a security policy in the monitoring device.

The criticality parameter can be used to group different security-critical events based on specifications from the security policy.

In an embodiment, the security-critical event and/or the criticality parameter is determined by a machine learning method, wherein the machine learning method comprises an algorithm which is trained by an evaluation of historical monitoring messages and known criticality parameters resulting from them.

Thus, the alarm signal of the orchestration device can be automatically adapted to, for example, a changed behavior of the guest computers and correspondingly changed monitoring messages from the guest computers.

In an embodiment, the relocation policy comprises at least one of the following information items for each criticality parameter:

at least one container instance and/or at least one container instance type and/or a container-based application that is relocated, at least one allowed second security level or at least one disallowed second security level, which the second guest computer must have.

The relocation policy thus flexibly defines the container instances to be relocated as well as the second security level of the target guest computer.

In an embodiment, the relocation policy comprises a time period for each criticality parameter, after the expiry of which the at least one container instance is relocated back from the second guest computer to a guest computer with the default security level or relocated to a guest computer with a third security level specified in the relocation policy.

Thus, the dwell time of the at least one relocated container instance on the second guest computer can be flexibly adapted to the criticality or the security state of the orchestrated environment. This increases the efficiency of the resource optimization.

In an embodiment, the time period is adjusted on receiving a further security alarm message depending on a further criticality parameter contained in the further security alarm message.

This means that the dwell time of the at least one relocated container instance can be adapted to further subsequent security alarm messages.

In an embodiment, after receiving at least one predefined security event in the orchestration device, the at least one container instance is relocated from the second guest computer back to a guest computer with the default security level or relocated to a guest computer with a third security level specified in the relocation policy.

This enables an event-driven relocation of container instances back to their original location.

In an embodiment, the at least one predefined security event is a vulnerability value, which is received in the monitoring device from at least one security function of the second guest computer and transmitted to the orchestration device.

Thus, the security function in the second guest systems can be used to determine the dwell time.

In an embodiment, the relocation of the container instance comprises stopping the container instance on the first guest computer and then launching the container instance on the second guest computer.

In an embodiment, the relocation of the container instance is carried out uninterrupted by a process relocation method common across all guest computers.

This ensures that the container instance runs continuously.

According to a further aspect, embodiments of the invention relate to an apparatus for automatic, security-induced relocation of at least one container instance in an orchestrated environment, which comprises more than one guest computer managed by an orchestration device, comprising the orchestration device and a monitoring device, which are designed in such a way as to carry out the following steps:

the orchestration device launching the container instance on a first guest computer that comprises security functions in accordance with a first security level,

receiving a security alarm message comprising at least one criticality parameter indicating a security state of the orchestrated environment, from a monitoring device in the orchestration device, the orchestration device determining a second security level, different from the first security level, for the container instance based on a relocation policy depending on the criticality parameter, and the orchestration device relocating the container instance to a second guest computer in the orchestrated environment, which comprises security functions in accordance with the second security level, wherein the orchestration device receives information about the security state in the guest computers of the orchestrated environment and the executed container instance dynamically by the security alarm message and the criticality parameter indicates a measure of this security state.

The apparatus has the same advantages as the method.

In an embodiment, the orchestration device and the monitoring device are integrated in one apparatus or wherein the orchestration device and the monitoring device are designed as physically separate pieces of apparatus, which transmit security alarms and/or security events via an external communication link.

An integrated apparatus has a higher failure resilience than a physically separate apparatus since no external resources are required for the external communication link. In the case of physically separate pieces of apparatus, an already existing orchestration device and/or an already existing monitoring device can be re-used and merely extended with the respective functions according to embodiments of the invention.

A further aspect of embodiments of the invention relate to a computer program product (non-transitory computer readable storage medium having instructions, which when executed by a processor, perform actions), comprising a non-volatile computer-readable medium which can be loaded directly into a memory of a digital computer, comprising program code parts which when they are executed by the digital computer cause the computer to carry out the steps of the method.

Unless otherwise specified in the description below, the terms "launch", "receive", "determine", "relocate" and the like, refer to actions and/or processes and/or processing steps that modify and/or generate data and/or convert the data into other data, wherein the data is or may be present in particular in the form of physical quantities, for example as electrical pulses.

The apparatus and components optionally contained therein, such as the orchestration device and the monitoring device and the like, may comprise one or more processors. In embodiments, a processor may be a main processor (Central Processing Unit, CPU), a microprocessor or a microcontroller, for example an application-specific integrated circuit or a digital signal processor, possibly in combination with a memory unit for storing program commands, etc.

A computer program product, such as a computer program means, can be provided or supplied, for example, as a storage medium, such as a memory card, USB stick, CD-ROM, DVD, or else in the form of a downloadable file from a server in a network.

BRIEF DESCRIPTION

Some of the embodiments will be described in detail, with references to the following Figures, wherein like designations denote like members, wherein:

6

DETAILED DESCRIPTION

Figure 1:
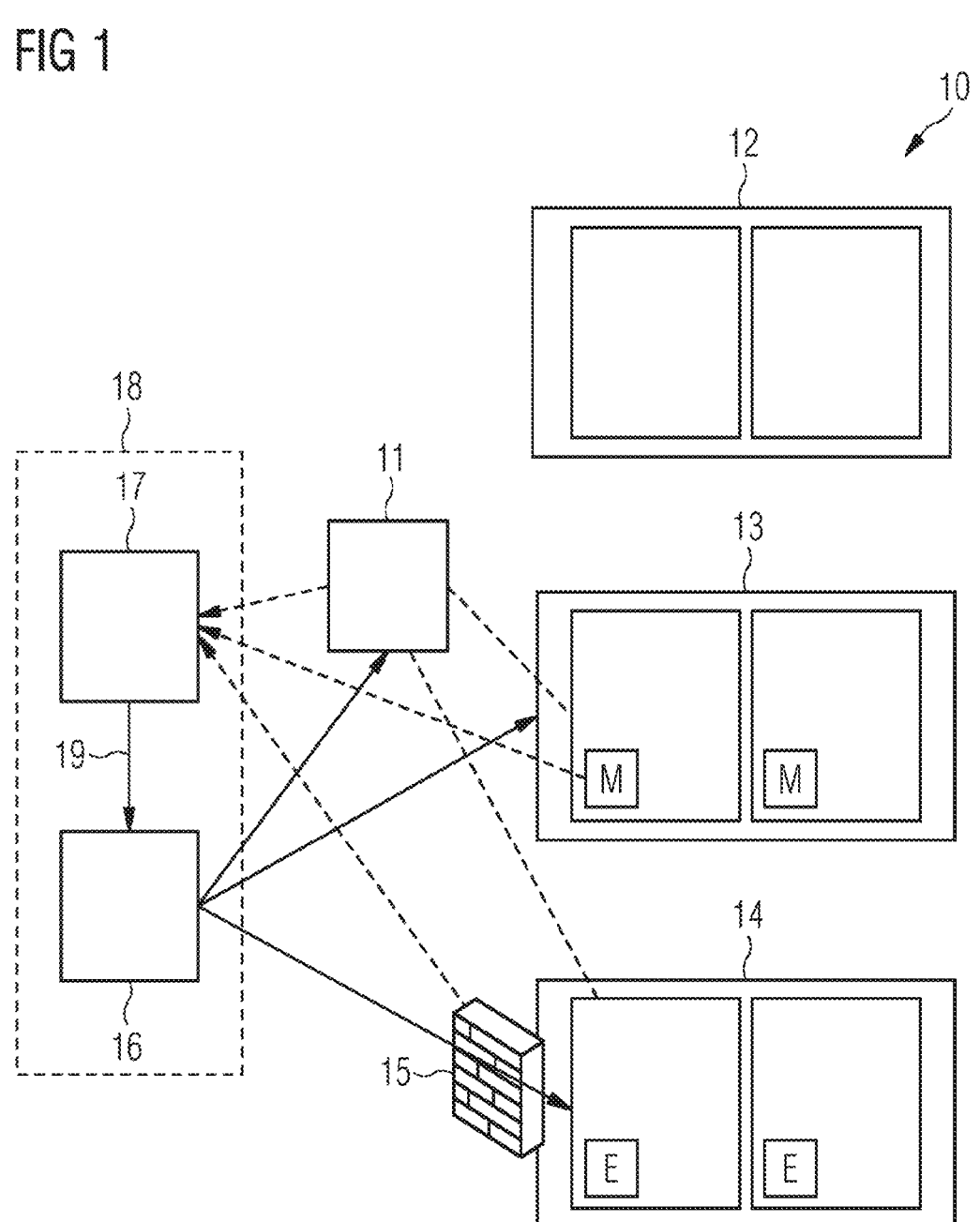
FIG. 1 shows a first exemplary embodiment of the apparatus n in an application scenario with an orchestrated environment in a schematic representation.

FIG. 1 shows an orchestrated runtime environment, here referred to in short as an orchestrated environment 10, as well as an orchestration device 16 and a monitoring device 17, which together form an apparatus 18 for the automatic relocation of a container instance 11.

The orchestrated environment 10 comprises guest computers 12, 13, 14, which are secured in different ways and each of which has different security functions. Each guest computer 12, 13, 14 is assigned a security level corresponding to its supported security functions. The orchestrated environment 10 can comprise one or more guest computers per security level. FIG. 1 shows different groups of guest computers having the same security level.

The guest computer 12 has few security functions and therefore has a low security level. The guest computer 12 is, for example, a container-as-a-service platform on which container instances of different customers are run. The guest computer 13 with a medium security level, for example, is a stand-alone virtual machine that comprises a file integrity monitoring function, and components for a container runtime vulnerability monitoring function, also known as container runtime vulnerability scanning. The security functions listed can be used by each individual guest computer 13 or be shared by a group of guest computers 13. The guest computer 14 with a high security level is, for example, a virtual machine from a group of virtual machines, which prohibits defined processes within the container instance with the help of a prohibiting function, also called an enforcer, and additionally blocks dedicated data connections by an installed firewall 15 and/or, in contrast to the less strongly secured guest computers 12, 13, analyzes permitted data connections or data communication with the aid of a Layer 7 firewall functionality and controls them by rules.

Each guest computer 12, 13, 14 and other components, such as the firewall 15 and also the container instance 11, transmits monitoring messages, also referred to as logs, in particular relating to security-relevant events to the monitoring device 17. The monitoring device 17 is designed to receive the monitoring messages, shown in FIG. 1 by a dashed arrow.

The orchestration device 16 is designed so as to select one of the guest computers 12, 13, 14 as the target platform for a container instance 11 and to start and stop the execution of the container instance on the selected guest computer. Conventionally, the orchestration device 16 is designed merely to stop and start the container instance 11 if it fails, or to scale the number of container instances 11 started due to a changed volume of requests. When scaling, additional container instances 11 are started or a subset of the launched container instances 11 are stopped, depending on the changed request volume.

The container instance 11 can execute an application program either alone or in conjunction with other, different container instances, for example. Container instances can be of different types, wherein for example, container instances created from different container images each form a container type, or container instances with a different common feature each form a container type.

The monitoring device 17 can be designed as a stand-alone relocated component, which is connected to the orchestration device 16 by an external communication link 19. Alternatively, the orchestration device 16 and the monitoring device 17 are formed as an integrated apparatus. The monitoring device 17 may also be designed as an additional component of the orchestration device 16.

The monitoring device 17 and the orchestration device 16 of the apparatus 18 are designed so as to carry out the method described below.

Figure 2:
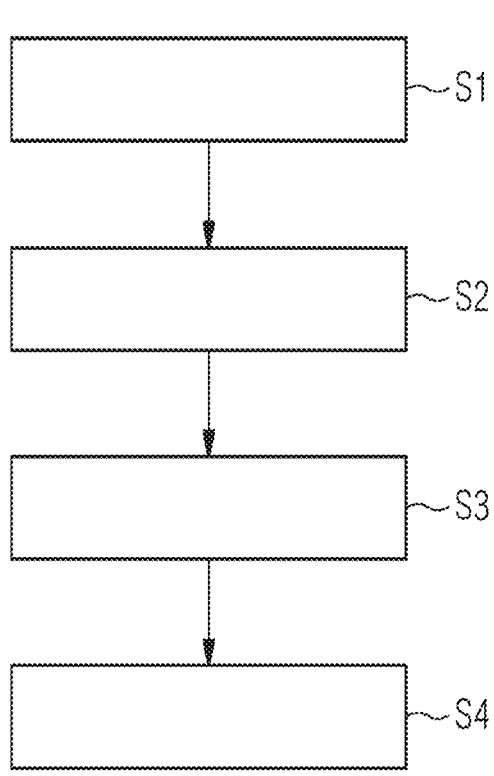
FIG. 2 shows an exemplary embodiment of the method in the form of a flowchart.

In embodiments, the method according to the invention will now be described on the basis of the flow diagram in FIG. 2 and based on the application scenario shown in FIG. 1.

In a first method step S1, the container instance 11 is launched by the orchestration device 16 on a first guest computer, for example, the guest computer 13, which comprises security functions in accordance with a first security level. The orchestration device 16 receives a security alarm message comprising at least one criticality parameter, which indicates a security state of the orchestrated environment 10, from the monitoring device 17, see method step S2. In method step S3, the orchestration device 16 determines a second security level for the container instance 11, different from the first security level, on the basis of a relocation policy depending on the criticality parameter. Subsequently, the container instance 11 is relocated by the orchestration device 16 to a second guest computer of the orchestrated environment 10, which comprises security functions in accordance with the second security level, for example guest computer 14 or also guest computer 12, see method step S4.

Figure 3:
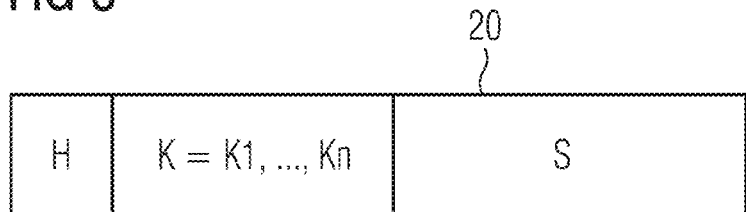
FIG. 3 shows an exemplary embodiment of a security alarm message.

FIG. 3 shows an exemplary embodiment of a security alarm message 20 according to the invention. The security alarm message comprises a header area H, which contains, for example, the address information of the orchestration device. In addition to other security parameters S, the security alarm message 20 comprises a criticality parameter K, which in turn consists of more than one sub-parameter K1, . . . , Kn.

Figure 4:
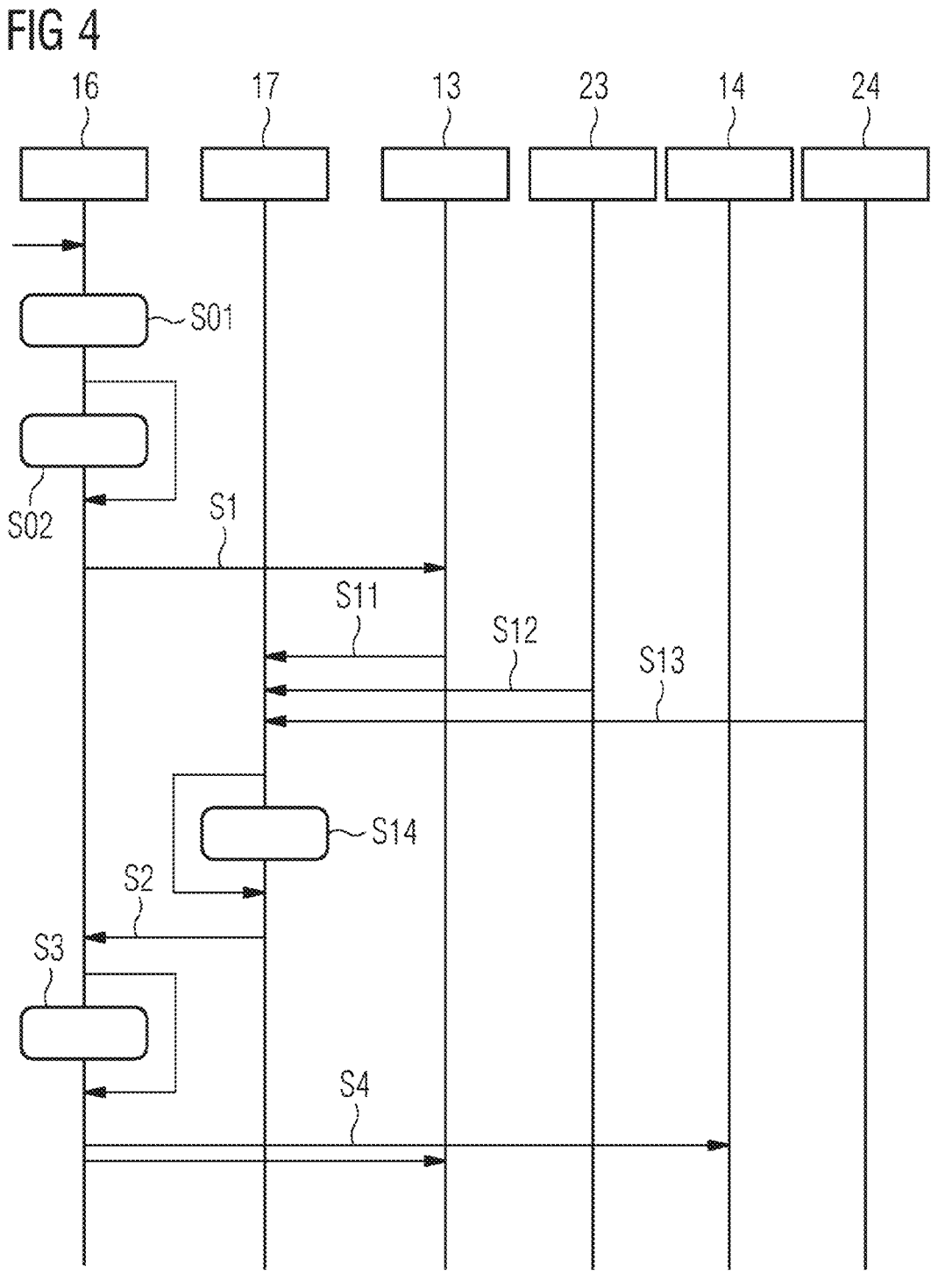
FIG. 4 shows a second exemplary embodiment of the method, exemplified by the apparatus according to the invention shown in FIG. 2 as a flow diagram.

An exemplary sequence of embodiments of the method will now be described in detail with reference to the sequence diagram in FIG. 4. Components that perform an action are arranged next to each other in the figure. These are the orchestration device 16, the monitoring device 17, the guest computer 13, which comprises security functions 23 in accordance with a first security level, and the guest computer 14, which comprises security functions 24 in accordance with a second security level. A timing sequence indicates the position of the actions in the vertical direction.

In a first step S01, the orchestration device 16 receives provisioning information and a relocation policy. The provisioning information comprises various parameters which the orchestration device 16 uses to configure the container instance 11 on the guest computer. In addition to the usual parameters, the provisioning policy now includes the first security level that specifies the security level of a guest machine on which the container instance 11 is to be launched for the first time. The first security level is specified in the provisioning information, in particular by a user of the container instance 11. The user is in particular the operator of the software application or the software program that is executed by the container instance 11. This allows the user to specify the security level of the guest computer on which the container instance 11 is to be launched for the first time. The default security level can also be specified by an administrator of the orchestrated environment, and this can be, for example, namespace-related.

The first security level is assigned as a default security level of the container instance 11 in the provisioning information and/or in the relocation policy. A label is used to assign the default security level. An exemplary embodiment of the provisioning information is given below:

```
apiVersion: v1
kind: Po
metadata:
    name: security-context-demo
    labels:
        default-security-level: 2
spec:
    securityContext:
        runAsUser: 1000
        runAsGroup: 3000
    containers:
    - name: mycontainer-name
        image: debian:buster
        command: [ "sh", "-c", "sleep 1h" ]
        securityContext:
            allowPrivilegeEscalation: false
            capabilities:
                drop: ["ALL"]
```

The orchestration device 16 selects a first guest computer with the specified default security level, in this case guest computer 13, see S02, and launches the container instance on the first guest computer, see S1.

Monitoring messages of all components are transmitted from the components to the monitoring device 14 at runtime. Thus, monitoring messages are transmitted from the first guest computer 13 to a security function 23 assigned to the first guest computer and from the guest computer 14 from the orchestrated environment 10 and a security function 24 assigned to the guest computer 14, see S11, S12, S13. Furthermore, the container instance or the containerized application also transmits monitoring messages to the monitoring device 17. The monitoring device 17 receives and correlates these monitoring messages, see S14. If a security-critical event is identified by the monitoring device 17, the monitoring device 17 generates a security alarm message and transmits it to the orchestration device 16, see S2.

The security alarm message may have different criticality parameters. The criticality parameter is determined depending on the security-critical event and a security policy in the monitoring device 17. In one variant embodiment, the security-critical event and/or the criticality parameter is determined by a machine learning method in the monitoring device 17. The machine learning method comprises an algorithm that is trained by the evaluation of historical monitoring messages and known criticality parameters resulting from them. The machine learning method can be continuously adapted by, for example, evaluating an average resource consumption of container instances over time and using it to change threshold values for an alarm dynamically. The trained algorithm returns a criticality parameter from current monitoring messages. This automatically adjusts the alarm.

If there are no machine learning methods available, the thresholds for the relocation can be adjusted manually. Alternatively, the threshold values for the criticality of the monitoring messages are adjusted in the relocation policy. For example, the container instance will no longer be relocated at a threshold value of 70%, but only when the alarm occurs at 80%. If manual adjustments to the relocation policy are required, these can be made at runtime so that adjustments in the orchestration device 16 are not necessarily required for a modified relocation behavior. This is particularly advantageous if the orchestration device 16 is reconfigured, for example, extended.

Within the relocation policy, the criticality parameter for which a container instance or all container instances of an application are relocated and for what time period is defined. In addition, an entry in the relocation policy can define that all container instances of a certain type may no longer run on a certain guest computer or on a guest computer with a low security level for a defined period of time, and that a relocation to a guest computer with a higher security level should take place. The relocation policy includes at least one of the following information items for each criticality parameter:

at least one container instance and/or at least one container instance type and/or a container-based application that is relocated, at least one allowed second security level or at least one disallowed second security level, which the second guest computer must have.

After comparing the security alarm message against the relocation policy and determining a second security level in the orchestration device 16, see S3, the latter relocates the container instance and/or other container instances to a second guest computer, which has security functions in accordance with the determined second security level. In the example shown in FIG. 4, the orchestration device 16 starts the container instance on the guest computer 14 and stops the container instance on the first guest computer, in this case guest computer 13.

In an exemplary embodiment, the relocation policy comprises a time period for each criticality parameter, after the expiry of which the at least one container instance is relocated back from the second guest computer to a guest computer with the default security level or relocated to a guest computer with a third security level specified in the relocation policy. The time interval for receiving a further security alarm message is adjusted depending on a further criticality parameter contained in the further security alarm message. The orchestration device 16 independently monitors the defined time period and initiates the relocation after the time period has expired.

Alternatively, an event-driven relocation is also possible. In this variant, the container instance remains on a second guest computer, for example with a higher security level, until a predefined security event informs the orchestration device 16 that the critical state is no longer present and the container instance can be relocated back to the less secure guest computer. In this variant embodiment, the at least one container instance is relocated from the second guest computer back to a guest computer with the default security level or relocated to a guest computer with a third security level specified in the relocation policy, if at least one predefined security event is received in the orchestration device 16.

A predefined security event, which e.g. can generate such a signal is a vulnerability scanner, for example, which is provided only on more highly secured guest computers and returns a vulnerability value, for example a so-called vulnerability score, to the monitoring device 17 and this subsequently informs the orchestration device 16. The at least one predefined security event is a vulnerability score, which is received in the monitoring device from at least one security function of the second guest computer and transmitted to the orchestration device.

The relocation of the container instance takes place uninterrupted, by using a common guest computer process relocation method that can also be carried out across guest computers. Alternatively, the container instance is stopped on the first guest computer 13, in particular on a less secured guest computer, and is started on the second guest computer 14, in particular a more highly secured guest computer, by the orchestration device 16. In a variant embodiment, the first security level of the first guest computer is lower than the second security level of the second guest computer.

In embodiments for the method, it is necessary that the orchestration device 16 trusts the monitoring device 17 and the monitoring device 17 receives trustworthy information from the integrated components.

By the method and the apparatus, individual or all container instances of a deployment, for example an application, can be temporarily relocated to more highly or differently secured guest computers as a result of a security event. The relocation of the container instances by the orchestration device is linked to the events generated by the monitoring device and no longer refers only to the restart of a container instance in the event of a failure or its scaling in the event of a shortage of resources. The relocation can be both time- and event-driven. In order to be able to carry out temporary security analyses at runtime or to temporarily restrict container instances, the deployment no longer needs to be manually adjusted at runtime. If necessary, the instance is automatically moved to a more highly secured node group.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for automatic, security-induced relocation of at least one container instance in an orchestrated environment, which comprises more than one guest computer managed by an orchestration device, said method comprising:

the orchestration device launching the container instance on a first guest computer that comprises security functions in accordance with a first security level;

receiving a security alarm message including at least one criticality parameter, which indicates a security state in the guest computers of the orchestrated environment, from a monitoring device in the orchestration device;

the orchestration device determining a second security level, different from the first security level, for the container instance based on a relocation policy depending on the at least one criticality parameter;

the orchestration device relocating the container instance to a second guest computer in the orchestrated environment, wherein the second guest computer comprises security functions in accordance with the second security level; and wherein the orchestration device receives information about the security state in the guest computers of the orchestrated environment dynamically by the security alarm message and the at least one criticality parameter indicates a measure of the security state in the guest computers of the orchestrated environment.

2. The method as claimed in claim 1, wherein the first security level is assigned to the container instance as a default security level of the container instance in the relocation policy and/or in provisioning information.

3. The method as claimed in claim 1, wherein the security alarm message is sent from the monitoring device to the orchestration device when a security-critical event is identified depending on at least one monitoring message, which is received from at least one guest computer of the orchestrated environment and/or from the container instance in the monitoring device.

4. The method as claimed in claim 3, wherein the at least one criticality parameter is determined depending on the security-critical event and a security policy in the monitoring device.

5. The method as claimed in claim 3, wherein the security-critical event and/or the at least one criticality parameter is determined by a machine learning method, wherein the machine learning method comprises an algorithm which is trained by an evaluation of historical monitoring messages and known criticality parameters resulting from them.

6. The method as claimed in claim 1, wherein the relocation policy comprises at least one of the following specifications for each criticality parameter:

at least one container instance and/or at least one container instance type and/or a container-based application that is relocated; and at least one allowed second security level or at least one disallowed second security level, which the second guest computer must have.

7. The method as claimed in claim 1, wherein the relocation policy comprises a time period for each criticality parameter, after the expiry of which the at least one container instance is relocated back from the second guest computer to a guest computer with the default security level or relocated to a guest computer with a third security level specified in the relocation policy.

8. The method as claimed in claim 7, wherein the time interval is adjusted upon receiving a further security alarm message depending on a further criticality parameter contained in the further security alarm message.

9. The method as claimed in claim 1, wherein after receiving at least one predefined security event in the orchestration device, the at least one container instance is relocated from the second guest computer back to a guest computer with the default security level or relocated to a guest computer with a third security level specified in the relocation policy.

10. The method as claimed in claim 9, wherein the at least one predefined security event is a vulnerability value, which is received in the monitoring device from at least one security function of the second guest computer and transmitted to the orchestration device.

11. The method as claimed in claim 1, wherein the relocation of the container instance comprises stopping the container instance on the first guest computer and then launching the container instance on the second guest computer.

12. The method as claimed in claim 1, wherein the relocation of the container instance is carried out uninterrupted by a process relocation method common across all guest computers.

13. An apparatus for automatic, security-induced relocation of at least one container instance in an orchestrated environment, which comprises more than one guest computer, managed by an orchestration device, said apparatus comprising the orchestration device and a monitoring device, which are configured in such a way as to carry out the following:

the orchestration device launching the container instance on a first guest computer that comprises security functions in accordance with a first security level;

receiving a security alarm message comprising at least one criticality parameter, which indicates a security state in the guest computers of the orchestrated environment, from a monitoring device in the orchestration device;

the orchestration device determining a second security level, different from the first security level, for the container instance based on a relocation policy depending on the at least one criticality parameter; and the orchestration device relocating the container instance to a second guest computer in the orchestrated environment, wherein the second guest computer comprises security functions in accordance with the second security level; and wherein the orchestration device receives information about the security state in the guest computers of the orchestrated environment dynamically by the security alarm message and the at least one criticality parameter indicates a measure of the security state in the guest computers of the orchestrated environment.

14. The apparatus as claimed in claim 13, wherein the orchestration device and the monitoring device are integrally configured or wherein the orchestration device and the monitoring device are configured physically separate, which transmit security alarms and/or security events via an external communication link.

15. A computer program product, comprising a computer readable hardware storage device having computer readable program code stored therein, the program code executable by a processor of a computer system to implement a method, wherein, when the program code are executed by the computer system cause the computer system to carry out the steps of the method as claimed in claim 1.

* * * * *